M. A. GREEN.
BEET HARVESTER.
APPLICATION FILED OCT. 29, 1917.

1,300,955.

Patented Apr. 15, 1919.
3 SHEETS—SHEET 1.

Inventor
M. A. Green
By Victor J. Evans
Attorney

Witness
E. P. Ruppert
Wm. T. Bagger

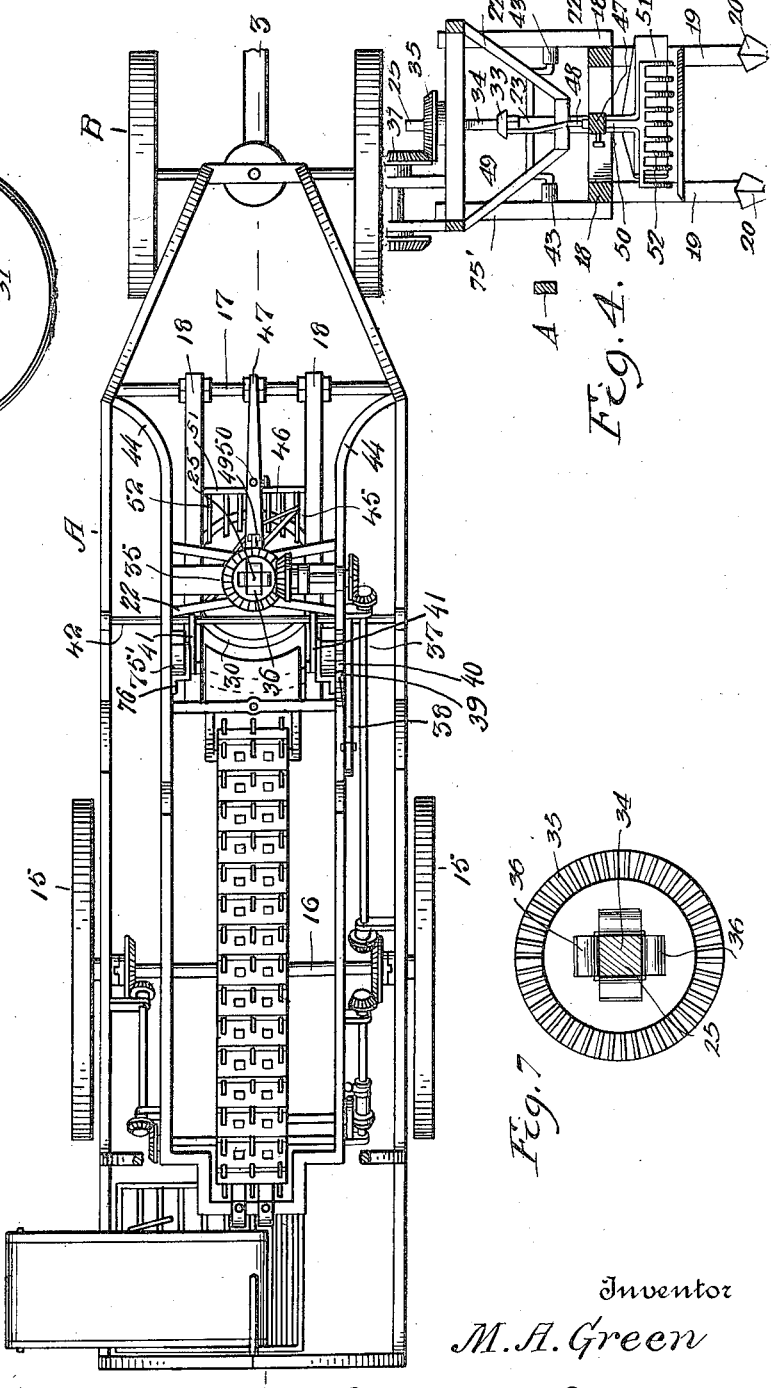

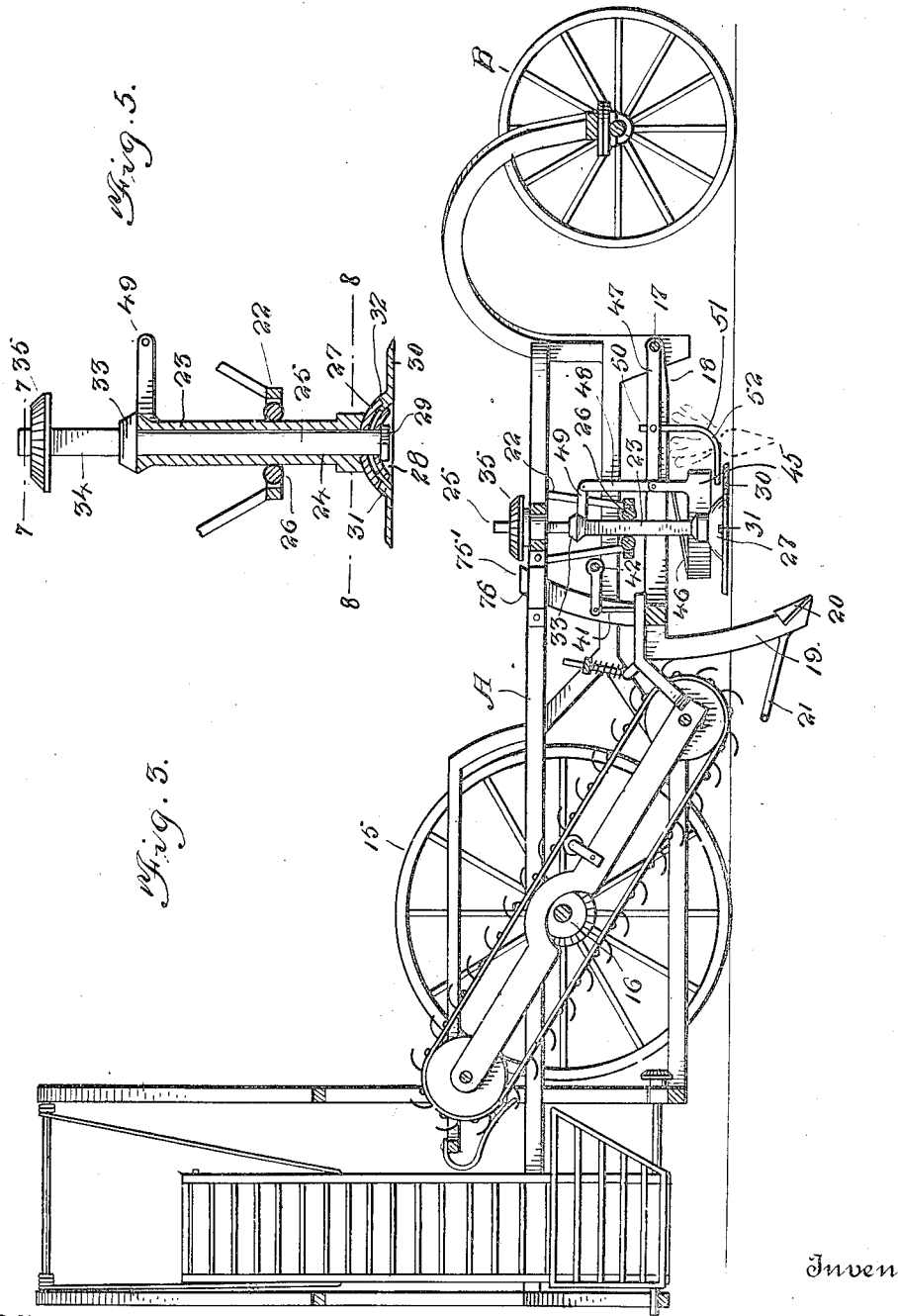

UNITED STATES PATENT OFFICE.

MORGAN A. GREEN, OF RUPERT, IDAHO.

BEET-HARVESTER.

1,300,955.  Specification of Letters Patent.  Patented Apr. 15, 1919.

Application filed October 29, 1917. Serial No. 199,047.

*To all whom it may concern:*

Be it known that I, MORGAN A. GREEN, a citizen of the United States, residing at Rupert, in the county of Minidoka and State of Idaho, have invented new and useful Improvements in Beet-Harvesters, of which the following is a specification.

This invention relates to beet harvesters and it has for its object to produce an organized machine of simple and improved construction whereby, at a single operation, the beets will be topped, and the beet roots lifted from the ground.

A particular object of the invention is to simplify and improve the construction of the topping mechanism and to support the same in such a manner as to be automatically adjustable for operation on beets that protrude variously above the ground.

A further object of the invention is to simplify and improve the gage mechanism whereby the topping mechanism is actuated.

A further object of the invention is to produce a simple and improved construction whereby when the plows or beet lifters are raised with respect to the ground, the topping mechanism as well as the beet pulling and carrying mechanism will be simultaneously adjusted.

With these and other ends in view which will readily appear as the nature of the invention is better understood, the same consists in the improved construction, novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Fig. 2 is a top plan view of the same.

Fig. 3 is a longitudinal sectional view taken on the line 3—3 in Fig. 2.

Fig. 4 is a transverse sectional view taken on the line 5—5 in Fig. 1.

Fig. 5 is a detail view enlarged of the topping mechanism, the same being shown partly in elevation and partly in section.

Fig. 6 is a horizontal sectional view taken on the line 7—7 in Fig. 5.

Fig. 7 is a horizontal sectional view taken on the line 8—8 in Fig. 5.

Corresponding parts in the several figures are denoted by like characters of reference.

Figure 1:
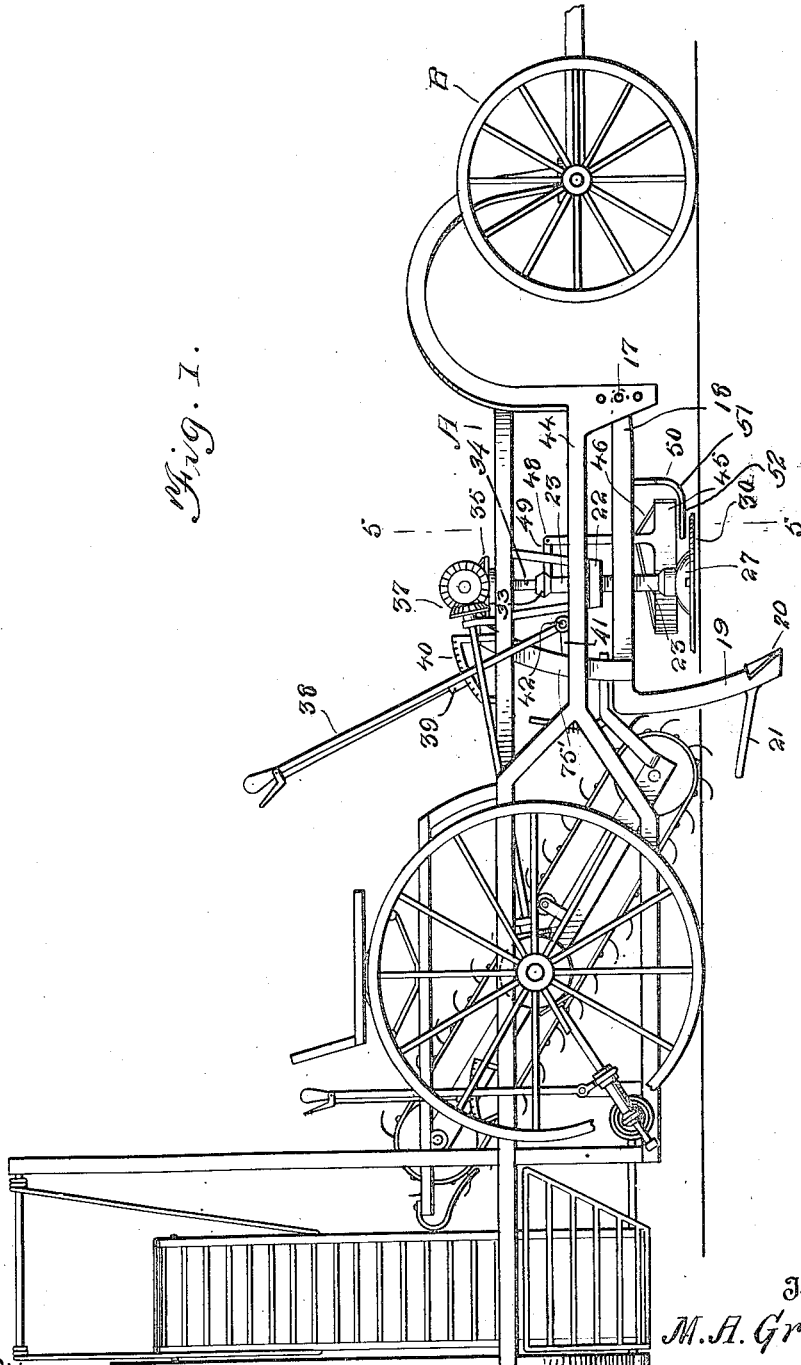
Figure 1 is a view in side elevation of the machine constructed in accordance with the invention.

The frame structure of the improved machine which is generally designated by A is supported at its forward end on a front truck B and at its rearward end on ground wheels 15, the same being mounted on an axle 16. The front truck is so constructed and arranged as to facilitate the quick turning of the machine in a short radius.

Pivotally connected with the frame structure by a pivot member 17 are the plow beams 18 having standards 19 carrying the diggers 20 and lifting members 21 whereby the beets will be excavated and lifted in the customary manner. The frame supports a bracket member 22 wherein the topping mechanism is guided for vertical movement. The said topping mechanism comprises a sleeve 23 of square cross section, said sleeve having a circular bore 24 in which a shaft 25 is supported for rotation. The sleeve 23 is guided between rollers 26 carried by the bracket 22, said rollers constituting anti-friction members whereby the vertical movement of the topping mechanism is facilitated. The shaft 25 carries near its lower end a cup-shaped disk 27 in the under concave side of which a washer 28 is fitted, said washer being also substantially cup-shaped. A nut 29 is provided whereby the washer 28 may be tightened against the disk 27. The topping knife 30 which is of annular shape is provided with upturned lugs 31 at the inner edge thereof, said lugs being adapted to fit in notches 32 in the disk 27 for the purpose of preventing the topping knife from rotating with respect to the shaft 25 when the parts are assembled for operation. The nut 29, when the parts are assembled, will be accommodated in the cavity in the underside of the washer 28 so as to present no obstruction to the operation of the device. It may be noted that the lower extremity of the sleeve 23 is concaved to accommodate it to the contour of the cup-shaped disk 27.

The shaft 25 has a flange or collar 33 engaging the upper end of the sleeve 23, and the portion of said shaft which extends upwardly with respect to the collar 33 is of square cross section as seen at 34. The square portion of the shaft extends through a beveled gear 35 which is mounted on the frame in an approximately horizontal plane, said beveled gear being equipped with anti-friction rollers 36 engaging the four faces of the square shaft portion 34, enabling the latter to move freely up and down with the sleeve 23. The beveled gear 35 is driven by a suitable transmission from one of the ground wheels 15, said transmission being generally designated by 37, and it being particularly understood that this transmission as well as other means used in this machine for the purpose of transmitting motion between moving parts may be of any suitable well known construction without any restriction as to the precise character thereof. It is also to be understood that wherever needed or desired well known means, such as clutches may be used for the purpose of interrupting the motion of moving parts, but such devices being well known in the art it has not been considered necessary to particularly describe or illustrate the same.

For the purpose of effecting vertical adjustment of the plow beams to permit the diggers to be placed in or out of ground engaging position and also to regulate the depth to which the diggers shall be permitted to enter into the ground, a hand lever 38 is provided, said hand lever having a stop member 39 engaging a segment rack 40. One arm of the lever 38 is connected by means of a link 41 with a cross bar 42 connecting the plow beams so that the latter will be simultaneously and equally adjusted. The sleeve 23 is provided with laterally disposed anti-friction rollers 43 normally riding on parts 44 of the frame structure but lying in the path of the plow beams 18 so that when the latter are materially lifted from the ground they will engage the rollers 43, thereby lifting the sleeve and related parts of the topping mechanism.

Extending obliquely across the topping knife is a fender 45 the purpose of which is to discharge in a lateral direction the tops which are cut from the beet roots by the action of the topping knife 30. This fender is connected by rods 46 with a beam 47 the rearward end of which is pivotally connected with the lower end of a link 48 the upper end of said link being pivoted on a lug 49 projecting forwardly from the sleeve 23. The forward end of the beam 47 may be connected with the pivot member 17 on which the plow beams are pivoted. Connected adjustably with the beam 47 is a vertically disposed arm or rod 50 carrying at its lower end a gage member comprising a rearwardly inclined bar 51 having a plurality of rearwardly extending fingers 52, said bars and fingers being adapted to ride freely over the portions of the beets that protrude above the ground. Being connected with the sleeve 23 by means just described it is obvious that when the gage device engages the beet that protrudes materially above the ground it will rise in order to pass over the same and will at the same time cause the sleeve 23 and related parts of the topping mechanism to move in an upward direction. Thus, a constant distance being preserved between the gage device and the topping knife, a portion of equal thickness will be removed from each beet, but the thickness of the portion thus removed may be varied by previous adjustment of the gage device with respect to the topping knife. The plow beams 18 are provided each with an arcuate guide member 75′ guided through the slot 76 in the frame structure of the machine for the purpose of maintaining the plows in proper position for operation and to prevent lateral movement thereof.

From the foregoing description taken in connection with the drawings hereto annexed, the operation and advantages of this invention will be readily understood by those skilled in the art to which it appertains. The general construction of the machine is simple and inexpensive; the parts will readily adapt themselves to the various requirements for successful operation and the parts are not liable to be disarranged or to get out of order.

I claim:—

1. In a beet harvester, a wheeled carrying frame and a topping device comprising a vertically movable sleeve of non-circular cross section, a knife carrying shaft mounted for rotation in said sleeve, said shaft having a portion of non-circular cross section, and a driving gear for the knife carrying shaft through which the non-circular portion of said shaft is guided.

2. In a beet harvester, a carrying frame having a bracket provided with anti-friction rollers disposed in a horizontal plane, a sleeve guided for vertical movement between said rollers, said sleeve being of square cross section, a knife carrying shaft journaled in the sleeve and having a collar engaging the upper end of the sleeve, that portion of said shaft which extends above the collar being of square cross section and a driving gear for the knife carrying shaft through which the square portion of said shaft is guided, said driving gear being provided with shaft engaging anti-friction rollers disposed in a horizontal plane.

3. In a beet harvester, a carrying frame having a bracket provided with anti-friction rollers disposed in a horizontal plane, a sleeve guided for vertical movement between said rollers, said sleeve being of square cross section, a knife carrying shaft journaled in the sleeve and having a collar engaging the upper end of the sleeve, that portion of said shaft which extends above the collar being of square cross section and a driving gear for the knife carrying shaft through which the square portion of said shaft is guided, said driving gear being provided with shaft engaging anti-friction rollers disposed in a horizontal plane, in combination with means for effecting vertical adjustment of the sleeve during the operation of the machine.

4. In a beet harvester, a carrying frame having a bracket provided with anti-friction rollers disposed in a horizontal plane, a sleeve guided for vertical movement between said rollers, said sleeve being of square cross section, a knife carrying shaft journaled in the sleeve and having a collar engaging the upper end of the sleeve, that portion of said shaft which extends above the collar being of square cross section and a driving gear for the knife carrying shaft through which the square portion of said shaft is guided, said driving gear being provided with shaft engaging anti-friction rollers disposed in a horizontal plane, in combination with means for effecting vertical adjustment of the sleeve during the operation of the machine, said means including a gage member supported adjustably and in fixed relation to said sleeve.

5. In a beet harvester, a wheeled supported carrying frame, plow beams pivotally connected therewith, a non-rotatable sleeve supported for vertical movement between the plow beams, a driven knife carrying shaft journaled in said sleeve, horizontally disposed rollers mounted on the sleeve and extending laterally therefrom in the path of the plow beams, and means for effecting vertical adjustment of the plow beams.

6. In a beet harvester, a topping device including a non-rotatable sleeve supported for vertical movement, a driven shaft supported for rotation in the sleeve and having a cup-shaped disk at its lower end, a cup-shaped washer coöperating with the disk, an annular knife positioned between the disk and the washer, said disk and knife having interengaging lugs and slots to prevent rotation of the knife, and assembling means for the disk, the washer and the knife.

7. In a beet harvester, a topping device including a non-rotatable sleeve supported for vertical movement, a driven shaft supported for rotation in the sleeve and having a cup-shaped disk at its lower end, a cup-shaped washer coöperating with the disk, an annular knife positioned between the disk and the washer, said disk and knife having interengaging lugs and slots to prevent rotation of the knife, and assembling means for the disk, the washer and the knife, said assembling means consisting of a nut for the reception of which the lower end of the rotary driven shaft is threaded, said nut being accommodated in the cavity of the washer when the parts are assembled.

8. In a beet harvester, a topping device comprising a vertically movable non-rotatable sleeve, a driven shaft supported for rotation in said sleeve and adjustable therewith, a circular knife connected with and carried by the shaft, a fender extending obliquely across the knife, a beam with which said fender is connected, a link connecting said beam with the vertically movable sleeve and a gage member adjustably connected with the beam.

9. In a beet harvester, a topping device comprising a vertically movable non-rotatable sleeve, a driven shaft supported for rotation in said sleeve and adjustable therewith, a circular knife connected with and carried by the shaft, a fender extending obliquely across the knife, a beam with which said fender is connected, a link connecting said beam with the vertically movable sleeve and a gage member adjustably connected with the beam, said parts being supported by a carrying frame with which the beam is connected.

In testimony whereof I affix my signature.

MORGAN A. GREEN.